3,078,757
CAMERA ADAPTED FOR MANUAL SUPPORT
Charles Lee Austin, Park Ridge, N.J., and Charles Allen Lotspeich, Granada Hills, Calif., assignors to Mitchell Camera Corporation, Glendale, Calif., a corporation of Delaware
Filed Oct. 24, 1960, Ser. No. 64,516
1 Claim. (Cl. 88—16)

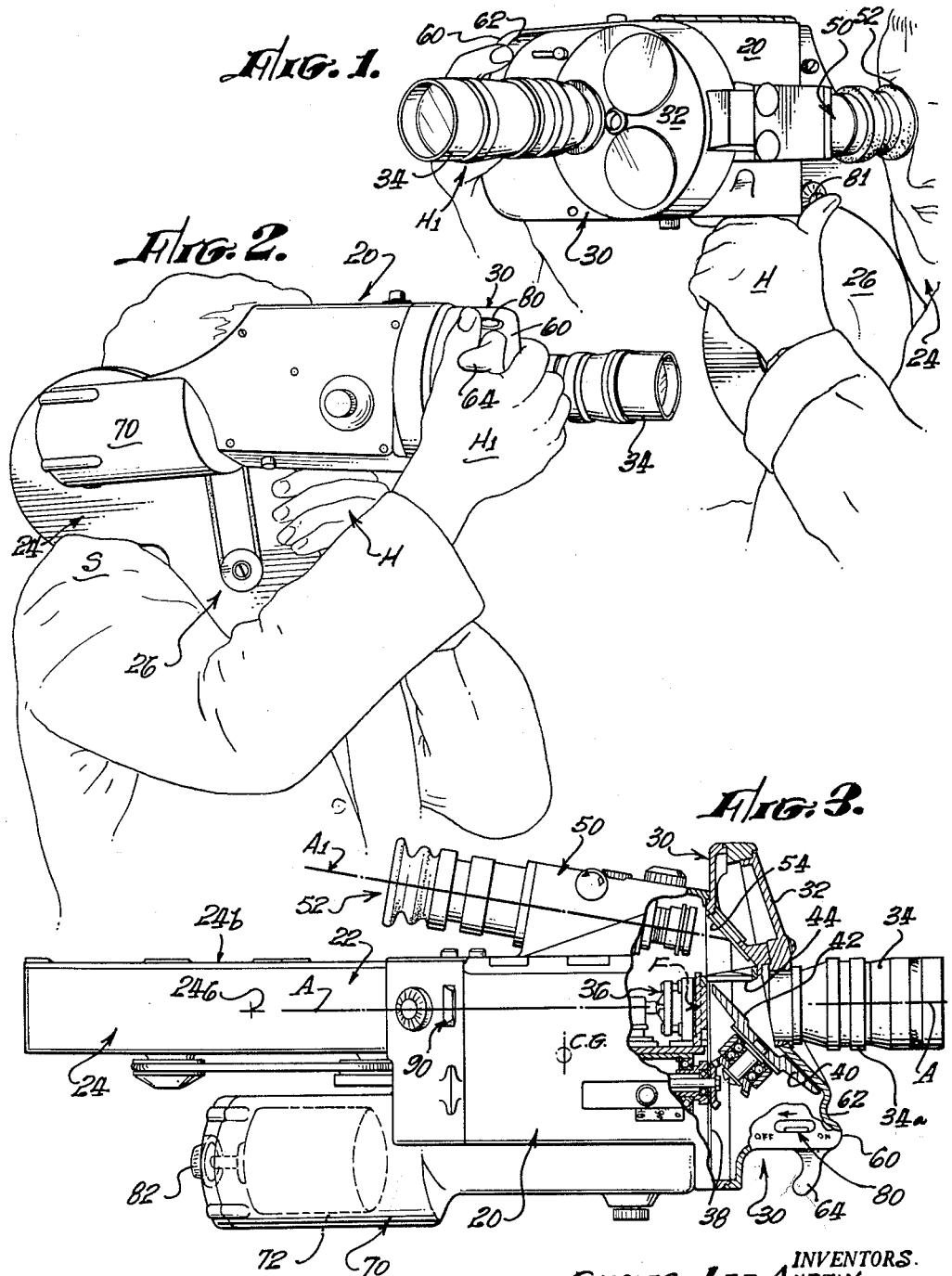

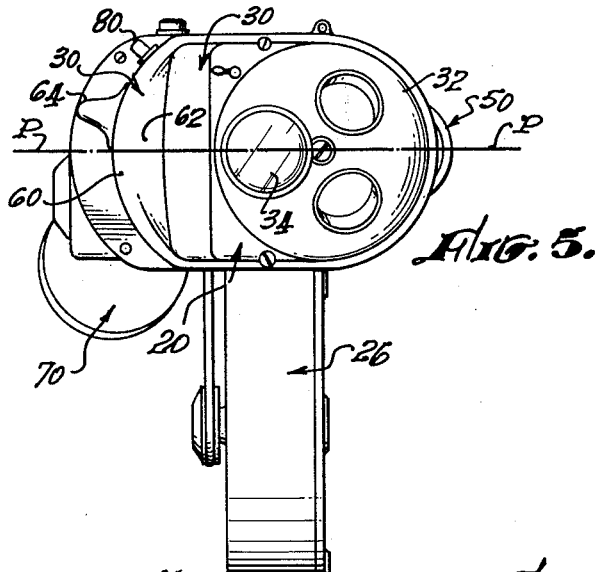
Fig. 5.
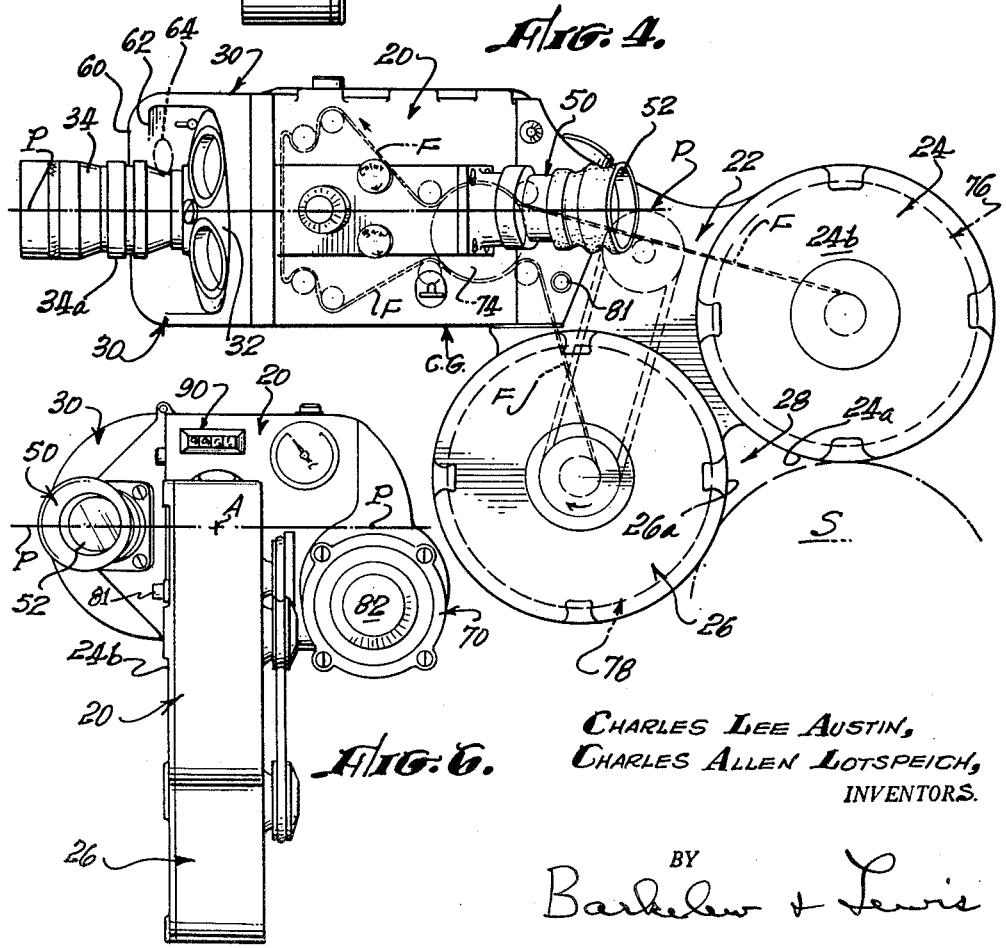
Fig. 4.
Fig. 6.
CHARLES LEE AUSTIN,
CHARLES ALLEN LOTSPEICH,
INVENTORS.
BY Barkelew & Lewis

United States Patent Office 3,078,757
Patented Feb. 26, 1963

This invention has to do with photographic cameras; and more particularly with motion picture cameras; and a general objective is the provision of a design which facilitates manual support, handling and control, with stability of position and orientation.

In past practice, it has been usual, if not universal, to support standard sized cameras, such as 35 mm. on heavy tripods with tilting and panning heads, to insure stability and smooth change of orientation in following or panning a subject. Generally, a 35 mm. camera has usually been thought too heavy to be manually supported and manipulated. And in common experience, manual support of small cameras, e.g., 8 mm., has almost universally resulted in uneven and jerky movement in following or panning a subject.

A major accomplishment of the present invention resides in the facility and relative ease with which even a camera of 35 mm. size can be manually supported, easily held in stable position or moved with smooth motion, and adjusted and controlled by the hands during use and exposures. The invention provides, among other things, a shoulder rest formed by the two film magazines, with the center of mass of the whole camera substantially on or close to the vertical central longitudinal plane of the shoulder rest and located closely forward of the rest. As one result, the forward end of the camera can be easily supported by one hand to which certain of the controls are immediately accessible to be finger or thumb operated. The other hand, to which certain other controls are closely available, may then hold the shoulder rest against the shoulder and, if desired, aid in the support. In general, the arrangement and design are such that at least one half the total weight is supported on the shoulder, while the other half or less is hand supported with a good effective leverage movement at the forward end of the camera body.

A typical and illustrative design embodying the invention is described in the following specification and shown in the accompanying drawings, wherein:

FIG. 1 and FIG. 2 are perspectives illustrating the camera in use;

FIG. 3 is a plan of the camera, with certain parts shown in section;

FIG. 4 is a left side elevation, as it would be seen from the right in FIG. 1; and FIGS. 5 and 6 are, respectively, front and rear elevations.

As shown in the drawings, the main body 20 of the camera is substantially rectangular in plan and elevation. Joined to the rear end of the main body (the end to the left in FIG. 3—to the right in FIG. 4) is a magazine unit 22 which includes two circular, cylindric, film magazines 24 and 26. As clearly shown in both FIGS. 2 and 4, magazine 24 is located above and behind magazine 26, so that the operator's supporting shoulder, as indicated at S in FIGS. 2 and 4, may fit under 24 and behind 26, more or less in the obtuse angled opening 28 formed between the lower surface 24a of magazine 24 and the rear surface 26a of magazine 26. The shoulder at S supports the rear end of the camera mainly by support on magazine 24. Magazine 26 is normally pressed back against the shoulder at S by the operator's hand grasping around the front of the lower magazine 26, as shown for the hand H in FIGS. 1 and 2. It is here remarked that the present illustrative design has been developed for resting on the operator's right shoulder, as shown in FIGS. 1 and 2, and the left hand at H most conveniently then grasps the lower magazine 26. At the points of shoulder contact with the two magazines, their surfaces present an obtuse angle (see FIG. 4); so that, depending on the pressure to the rear exerted by the left hand, the transverse vertical plane of shoulder support is considerably forward of the shoulder contact under upper magazine 24. The longitudinal relation of that support plane to the center of mass of the whole camera is later referred to.

From the several figures it is seen that lower magazine 26 is located wholly or substantially wholly below camera body 20, and that the upper magazine has its lower rest surface 24a also below the body, or, at any rate, well below the optical plane of the camera indicated in the figures by the lines P—P.

At the front end of body 20 there is a body sub-member 30 which carries and houses the lens turret 32 here shown as carrying one lens assembly 34 in position on the optical axis A (FIG. 3) in the optical plane P (FIG. 4). In FIG. 3 the plane of the photographic film behind lens 34 is indicated at F and the intermittent film movement at 36. Shutter 38 controls intermittent exposure of film F during dwell periods, in the usual manner. In front of exposure shutter 38 another shutter 40 on an angular axis in housing unit 30 has reflecting surfaces, such as at 42, on its face, that reflect the light from objective 34 to a ground glass surface 44, at the same optical distance from the lens as is the film. Shutter 40 has openings that pass the light to the film in synchronism with shutter 38. A focussing view finder 50 with its ocular aperture at 52, views the image on 44 via a reflective surface 54. The view finder may be of known type in its optical system.

The optical arrangements here described for throwing an image to the view finder, so that the photographing objective image may be focussed on film F by observation in the view finder, are well known. They are only described here to show that 50 operates as a focussing view finder. Focussing is accomplished by the usual focussing ring, such as 34a, on the lens assembly tube. It is the relative location of the ocular aperture of the view finder that is important in the present invention.

The scale of FIGS. 3 to 6 is about one-third the actual dimensions of a typical 35 mm. camera illustrative of the invention. The optical plane P (FIG. 4) on which the view finder is centered is located about six inches above the shoulder support surface 24a. In plan (FIG. 3) optical axis A1 of the view finder makes an angle of about 10° with the main optical axis A; and, at the ocular aperture 52, the view finder axis is spaced in plan about 3¼ inches from axis A, on which the magazines 24, 26 are centered in plan, and spaced in plan about two inches from the vertical side surface 24b of upper magazine 24. (See FIGS. 3 and 6.) Looking forward along the camera axis the view finder ocular aperture is to the left of magazine surface 24b by that amount. Its height relative to the shoulder rest, its spacing to the left, and its angle in plan, put it in convenient position for the right eye when the camera is supported on the right shoulder with the right side of the head close to or against magazine surface 24b. (See FIG. 1.)

The forward body sub-unit 30 has, at its right hand side (looking forward) a rounded vertically extending formation 60, with a depression 62 immediately inward of it (see FIGS. 1, 3 and 5), adapted to be grasped by the fingers of the right hand H1 (FIG. 2) while the thumb engages behind and under the thumb lug 64. The distance of 60 forward of shouldering surface 26a is about fourteen inches; in a convenient position for right-hand grasp with 26a held back against the shoulder. At that distance forward the right hand helps to press 26a back against the shoulder and easily supports its part of the total camera weight. A camera of the size here indicated weighs about twenty pounds loaded with film, and its center of mass is located approximately at the under face of body 20 at the point of the arrow C.G. in FIG. 4, and its location in plan is indicated by the cross mark C.G. in FIG. 3. The mass center is thus approximately equally spaced between the shoulder support at 24a, 26a and the hand support at 60, 64; and, if anything, closer to the shoulder support at 24a, 26a than to the hand support. The shoulder thus takes, preferably, somewhat more than half the weight.

In plan, as will be seen in FIG. 3, the mass center is closely on a line between the shoulder support position (indicated approximately in FIG. 3 by the cross-mark 246) and the hand support at 60, 64. And, from FIG. 4, it is seen that in elevation the mass center is approximately on a line between shoulder support 24a, 26a and hand support at 60, 64. Further, from FIG. 3, it will be seen that the shoulder support under the magazines is in the vertical plane A—A of the optical axis and that the center of mass at C.G. is close to that vertical plane. The location of the heavy driving motor 72, spoken of later, is one primary reason for the mass center being located in plan at C.G. and low down as indicated in FIG. 4. Consequently, the camera thus supported is in at least approximately stable equilibrium, with very little or no tendency to fall over laterally.

The camera casing, and total mass, also includes a motor casing 70, enclosing driving motor 72, and located at the side of main body 20 and of magazine 24 opposite the left hand side location of view finder 50. Motor 72 drives film movement 36 and shutters 38 and 40, and also the film feed, indicated at 74 in FIG. 4, by a known transmission train, not here shown. The path of the film F, from supply reel 76 in magazine 24, through movement 36, to take-up reel 78 in magazine 26, is indicated in FIG. 4. The take-up reel is driven, as usual, from the motor driven train.

The location of the motor, a usually heavy element, is important in the low and centered location of the whole center of mass. Being at the side opposite the view finder and its appurtenances (FIG. 3) it places the whole mass center close to that support plane A—A in FIG. 3. Being well to the rear of the body it brings C.G. well rearward. And (see FIGS. 5 and 6) its low location, well below the optical axis, assists the low location of the magazines in bringing C.G. down to the level indicated in FIG. 4.

Off and on control for the motor includes a switch operated by the off-and-on shift button shown at 80 in FIGS. 2, 3, and 5. Another off-and-on motor control switch may be operated by a push button in a position such as shown at 81 in FIGS. 1, 4 and 6, conveniently accessible to the thumb of left hand H as shown in FIG. 1. Electrical connections between the manual buttons 80 and 81 and a supply circuit and the motor to facilitate motor control by either of the buttons, are well known and not illustrated here. The off-on shift button 80 is located in such a position, as illustrated in FIG. 2, to be easily reached and operated by the thumb of the right hand H1, while supporting the camera. Other motor controls, such as speed control dial 82, may be located elsewhere.

The film footage meter 90, driven from the driving train in known manner, is located at the rear end of the body (FIGS. 3 and 6) where it can be seen by the right eye.

Focussing ring, such as 34a, on the lens assembly 34, is easily reached by the left hand H while the right hand H1 supports the camera against the shoulder.

We claim:

A camera adapted for manual support during operation comprising, in combination:
  a body having a front and a rear end,
  a photographic lens carried on the front end of the body on a normally horizontal optical axis lying in a normally vertical longitudinal plane,
  a magazine unit attached to the rear end of the body comprising a pair of flat magazines located substantially in said vertical longitudinal plane and adapted to be rested on an operator's shoulder,
  a first one of said magazines extending rearwardly from the body, located at least in major portion below said optical axis, and presenting a downwardly facing shoulder support surface at its lower edge,
  the second of said magazines being located below the body, extending downwardly and forwardly under the body from the first magazine, and presenting a rearwardly and downwardly facing shoulder support surface forward of and below the support surface of the first magazine,
  said last mentioned support surface making with said first mentioned support surface an obtuse angle presenting an obtuse angled space for shoulder reception,
  a formation on a front portion of the body adapted to be engaged by the operator's hand to support the front of the body and to press said second mentioned shoulder support surface rearwardly against the shoulder,
  a view finder assembly mounted on one side of the body and extending rearwardly at an angle outwardly from the body with its ocular end spaced outwardly from that side of the body and of the magazine unit,
  and a driving motor mounted in a rearward extension from the opposite side of the body, said extension and motor being located alongside the opposite side of the first mentioned magazine and substantially below said photographic optical axis,
  all whereby the center of mass of the whole camera is located close to the vertical longitudinal plane of the photographic lens and of the magazine unit with its shoulder support surfaces, and low down and horizontally close to said shoulder support surfaces.

References Cited in the file of this patent

UNITED STATES PATENTS

| | | |
|---|---|---|
| 2,166,147 | Heinsch et al. | July 18, 1939 |
| 2,198,417 | Scheibell | Apr. 23, 1940 |
| 2,307,646 | Sonne | Jan. 5, 1943 |
| 2,793,573 | Cuchet | May 28, 1957 |
| 2,907,531 | Badgley | Oct. 6, 1959 |
| 2,910,911 | Wilkins et al. | Nov. 3, 1959 |

FOREIGN PATENTS

| | | |
|---|---|---|
| 1,219,748 | France | Dec. 28, 1959 |